(12) United States Patent
Jones et al.

(10) Patent No.: US 6,792,130 B1
(45) Date of Patent: Sep. 14, 2004

(54) SYSTEM AND METHOD FOR EMBEDDING A WATERMARK SIGNAL THAT CONTAINS MESSAGE DATA IN A DIGITAL IMAGE

(75) Inventors: Paul W. Jones, Churchville, NY (US); Chris W. Honsinger, Ontario, NY (US); Majid Rabbani, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 592 days.

(21) Appl. No.: 09/736,047

(22) Filed: Dec. 13, 2000

(51) Int. Cl.[7] .............................................. G06K 9/00
(52) U.S. Cl. ...................... 382/100; 382/279; 380/34
(58) Field of Search ................................. 382/100, 271, 382/298; 380/34, 219, 220

(56) References Cited

U.S. PATENT DOCUMENTS

| | | | |
|---|---|---|---|
| 5,113,443 A | * 5/1992 | Brockman | ................... 380/34 |
| 5,636,292 A | 6/1997 | Rhoads | |
| 5,809,139 A | 9/1998 | Girod et al. | |
| 5,901,178 A | 5/1999 | Lee et al. | |
| 5,915,027 A | * 6/1999 | Cox et al. | ..................... 380/54 |
| 5,991,426 A | 11/1999 | Cox et al. | |
| 6,026,193 A | 2/2000 | Rhoads | |
| 6,044,156 A | 3/2000 | Honsinger et al. | |
| 6,141,441 A | * 10/2000 | Cass et al. | ................... 382/166 |
| 6,449,379 B1 | * 9/2002 | Rhoads | ....................... 382/100 |
| 6,594,373 B1 | * 7/2003 | Gustafson | ................... 382/100 |

OTHER PUBLICATIONS

Wolfgang et al., *Perceptual Watermarks for Digital Images and Video*, Proceedings of the IEEE, vol. 87, No. 7, Jul. 1999, pp. 1108–1126.

Hartung et al., *Multimedia Watermarking Techniques*, Proceedings of the IEEE, vol. 87, No. 7, Jul. 1999, pp. 1079–1107.

* cited by examiner

Primary Examiner—Amelia M. Au
Assistant Examiner—Charles Kim
(74) Attorney, Agent, or Firm—Peyton C. Watkins

(57) ABSTRACT

A method for embedding a watermark signal that contains message data in a digital image sequence having two or more frames, includes the steps of: producing a set of two or more different carrier signals from a single secure key; assigning a carrier signal from the set of carrier signals to each frame in the sequence; and embedding a watermark signal in each frame using the corresponding assigned carrier signal.

23 Claims, 7 Drawing Sheets

SYSTEM AND METHOD FOR EMBEDDING A WATERMARK SIGNAL THAT CONTAINS MESSAGE DATA IN A DIGITAL IMAGE

FIELD OF THE INVENTION

The invention relates generally to the field of digital image processing, and in particular to a method for embedding watermarks in digital image sequences.

BACKGROUND OF THE INVENTION

Digital watermarking refers to the embedding of a hidden message in an image or image sequence for such purposes as establishing ownership, tracking the origin of the data, preventing unauthorized copying, or conveying additional information (meta-data) about the content. Watermarking has potential uses in a wide range of products, including digital still and video cameras, printers and other hardcopy output devices, and content delivery services (e.g., Internet-based photofinishing). Recently, there has been significant interest in the electronic distribution and display of theatrical movies, which is termed digital cinema. Studios and distributors have a strong need to protect the movie content from unauthorized use, and watermarking can assist by establishing ownership and tracing the source of stolen content (through the use of hidden date/time/location stamps inserted at the time of the movie distribution and/or presentation). The present invention relates specifically to the watermarking of image sequences, and thus it has usefulness in an application such as digital cinema.

Numerous watermarking methods have been described in the prior art, including both patents and the technical literature. Many of these methods are described in review papers such as: Hartung and Kutter, Multimedia Watermarking Techniques, Proc. IEEE, 87(7), pp. 1079–1107 (1999), and Wolfgang et al., Perceptual Watermarks for Digital Images and Video, Proc. IEEE, 87(7), pp. 1108–1126 (1999).

A basic distinction between various methods is whether the watermark is applied in the spatial domain or the frequency domain. In either approach, many techniques make use of a pseudo-random (PN) sequence in the watermark generation and extraction processes. The PN sequence serves as a carrier signal, which is modulated by the original message data, resulting in dispersed message data (i.e., the watermark) that is distributed across a number of pixels in the image. A secret key (i.e., seed value) is commonly used in generating the PN sequence, and knowledge of the key is required to extract the watermark and the associated original message data.

As noted in the review papers by Hartung et al. and by Wolfgang et al., most research on watermarking techniques has focused on single-frame images, and there are significantly fewer methods that are specific to image sequences (i.e., video watermarking). Of course, a watermarking method that has been designed for single-frame images could be applied to an image sequence by merely repeating the same process for each frame. However, this approach has the disadvantage that the fixed watermark pattern may become perceptually objectionable when the image sequence is displayed in real-time.

There are several prior art patents that include video-specific watermarking methods: U.S. Pat. No. 5,809,139 issued Sep. 15, 1998 to Girod et al. entitled Watermarking Method and Apparatus for Compressed Digital Video, B. Girod et al., Sep. 15, 1998; U.S. Pat. No. 5,901,178 issued May 4, 1999 to Lee et al. entitled Post-Compression Hidden Data Transport for Video; U.S. Pat. No. 5,991,426 issued Nov. 23, 1999 to Cox et al. entitled Field-Based Watermark Insertion and Detection; and U.S. Pat. No. 6,026,193 issued Feb. 15, 2000 to Rhoads entitled Video Steganography.

In the patents by Girod et al. and Lee et al., the methods are designed for directly embedding a watermark in compressed frequency-domain video streams (such as MPEG-encoded sequences). The patent by Cox et al. describes a method for alternately embedding positive and negative watermarks in consecutive fields of an interlaced video signal; this method is not suitable for progressively scanned image sequences such as those used in digital cinema applications. The patent by Rhoads discloses the basic concept of using multiple watermarked frames from an image sequence to extract the watermark with a higher degree of confidence than would be obtained with only a single frame. However, the methods described in all of the aforementioned patents make use of the same watermarking pattern in each successive frame of the sequence. As a result, these methods are subject to the same disadvantage as previously mentioned, namely, the presence of a fixed watermark pattern that can be objectionable.

There are obvious modifications that can eliminate the fixed watermark pattern, but they also suffer from limitations. One modification is to change the PN carrier from frame to frame by using a different key for each frame. However, the management of numerous keys becomes problematic. Another modification is to change the message while using the same carrier signal, but it may not be desirable to change the message from frame to frame in many applications. Moreover, changing the message from frame to frame does not allow information from multiple frames to be combined when extracting the watermark. This limitation reduces the robustness of the watermark extraction process to certain types of removal attacks.

There is a need therefore for an improved watermarking technique that: (1) minimizes the visibility of the watermark when the watermarked sequence is displayed in real-time; (2) requires only a single key for the generation and extraction of the watermark data; and (3) allows for information from multiple frames to be combined when extracting the watermark.

SUMMARY OF THE INVENTION

The need is met according to the present invention by providing a method for embedding a watermark signal that contains message data in a digital image sequence having two or more frames, including the steps of: producing a set of two or more different carrier signals from a single secure key; assigning a carrier signal from the set of carrier signals to each frame in the sequence; and embedding a watermark signal in each frame using the corresponding assigned carrier signal.

ADVANTAGES

The present invention minimizes the visibility of a watermark in an image sequence while simultaneously providing the convenience of a single-key system. The invention also allows watermark information to be combined from multiple frames, which improves the robustness of the watermark extraction process.

DETAILED DESCRIPTION OF THE INVENTION

The present invention overcomes the limitations of the prior art by using a single key to generate multiple carriers for the watermarking of an image sequence. The use of multiple carriers minimizes the visibility of a watermark by preventing spatial alignment of the same watermark pattern from frame to frame. However, unlike systems where different secret keys are used in generating the carriers, the present invention uses only a single key in combination with deterministic transformations of either the key or the associated carrier to produce multiple carriers. The robustness of the watermark extraction process is unchanged when it is applied to a single frame, because the same carrier is used within a given frame. However, because the same message is embedded in each frame, it is possible to combine information from multiple frames after determination of the carrier signal that was used for each frame. The present invention is aimed primarily at watermark methods that embed in the spatial domain using a PN sequence in producing a carrier signal. However, it can also be applied to frequency domain methods that use a PN sequence in the watermarking process.

The present invention is preferably implemented by a programmed digital computer. The computer can be a general purpose digital computer or a special purpose computer for digital image processing. It is within the ordinary skill in the programming art to provide a computer program for practicing the present invention from the following description of the invention.

Figure 1:
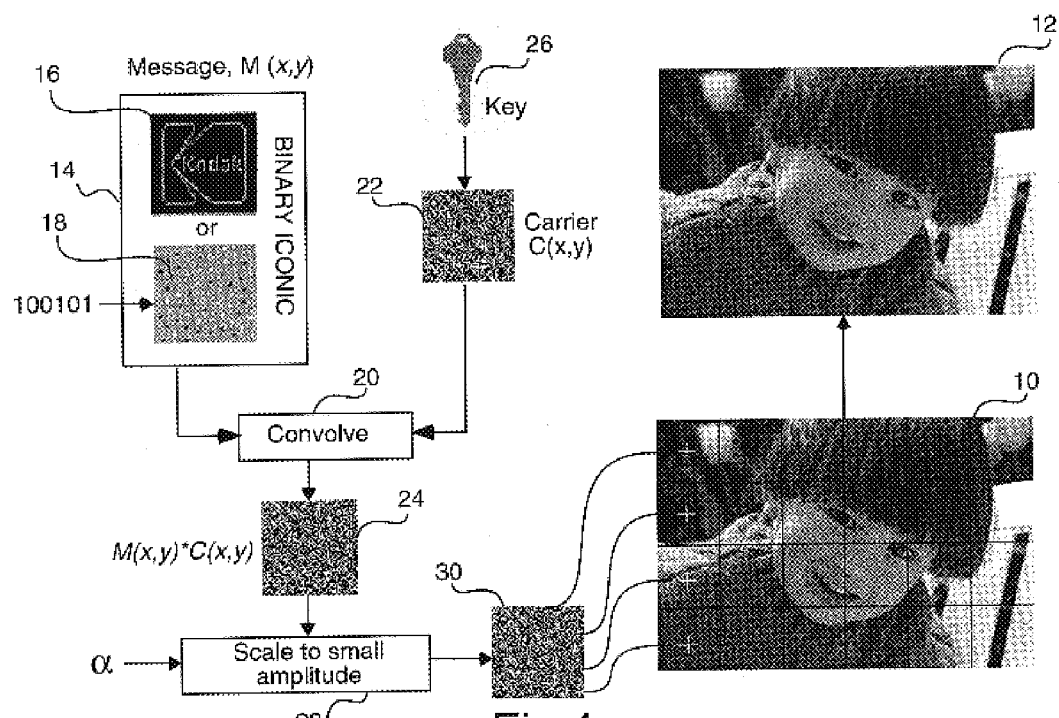
FIG. 1 is a prior art method for embedding a watermark in an original image.

A preferred data embedding technique for use with the present invention is disclosed in U.S. Pat. No. 6,044,156 issued Mar. 28, 2000 to Honsinger et al. entitled Method for Generating an Improved Carrier for Use in an Image Data Embedding Application. This patent is included in its entirety by reference. Referring to FIG. 1, in this technique, an original two-dimensional image 10, I(x,y), is processed to produce a watermarked image 12, I'(x,y). A two-dimensional message 14, M(x,y), represents the data to be embedded in the original image. In its most general form, the message 14 is an image, and it can represent an icon 16 (e.g., a trademark), or it can represent the bits 18 in a binary message. In the latter case, the on and off states of the bits are represented as plus and minus ones (more specifically, positive and negative delta functions), which are placed in predefined and unique locations across the message image. Examples of iconic message data are trademarks, corporate logos or other arbitrary images. In order to minimize the message energy, an edge map of the icon is often used instead of the actual icon. Examples of binary message data are 32-bit representations of URL's, and copyright ID codes, or authentication information.

As shown in FIG. 1, the fundamental steps for embedding message data in an original image with this method are:

1. A n×n message image 14, M(x,y), is generated from the message data;
2. The message image 14 is circularly convolved 20 with a n×n carrier image 22, C(x,y), to produce a n×n dispersed message image 24. The carrier image may be produced using a secure key 26 as is known in the prior art;
3. The dispersed message image 24 is scaled 28 in amplitude using a multiplicative factor α; and
4. The scaled dispersed message image 30 is added to the original image 10 as contiguous n×n tiles to form a watermarked image 12, I'(x,y).

The tiling of the dispersed message images forms the watermark pattern that is combined with the original image. The scaling factor α is an arbitrary constant chosen to make the watermark pattern simultaneously invisible and robust to common processing. Typically, the size of the dispersed message image 24 is chosen to be smaller than the size of original image 10, and the tiling process allows the scaled dispersed message image 30 to be repetitively embedded over the extent of the original image 10. The repetitive structure provides robustness to the watermark when image processing operations (such as cropping, compression, low-pass filtering, etc.) are applied to the watermarked image. Other watermarking techniques use different methods for embedding the message data, but the repetitive nature of the embedding process is a common aspect because of this improved robustness.

This embedding process for each tile can be described mathematically as:

$$I'(x,y)=\alpha[M(x,y)*C(x,y)]+I(x,y), \qquad (1)$$

where the symbol * represents circular convolution. From Fourier theory, spatial convolution is equivalent in the frequency domain to adding phase while multiplying magnitudes. Therefore, the effect of convolving the message image 14 with the carrier image 22 is to distribute the message energy in accordance with the phase of the carrier image and to modulate the amplitude spectrum of the message image with the amplitude spectrum of the carrier image. If the message image were a single delta function $\delta(x,y)$, and the carrier image had random phase and substantially flat Fourier magnitude, the effect of convolving with the carrier image would be to distribute the delta function over space. Similarly, the effect of convolving a message image with a random phase carrier image is to spatially disperse the message energy.

Figure 2:
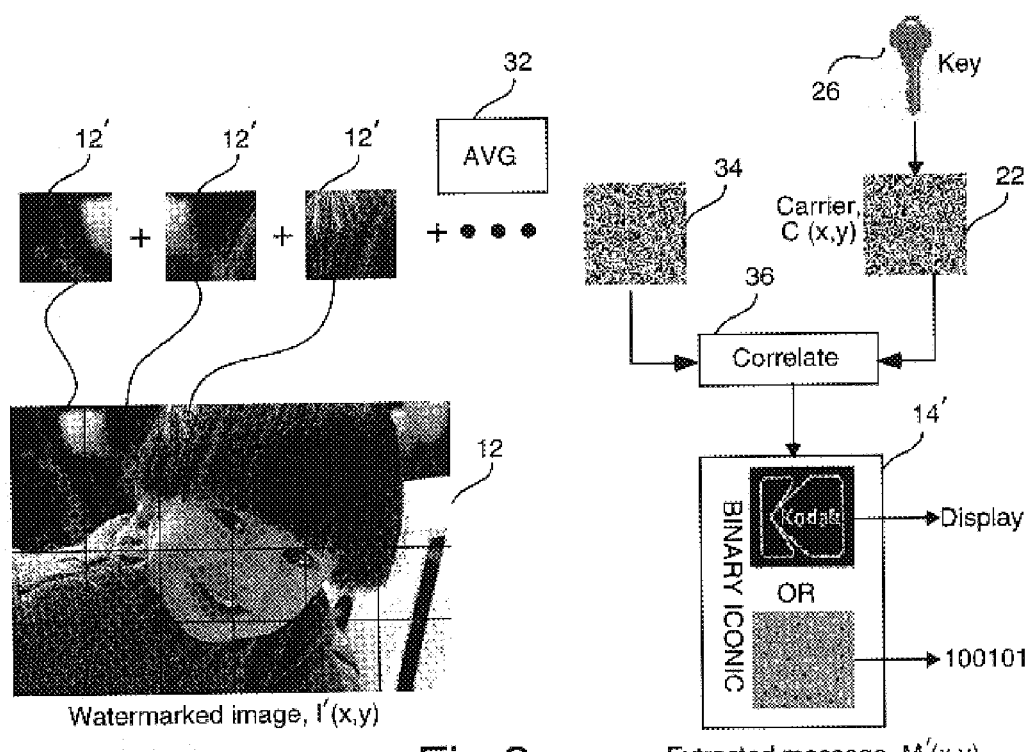
FIG. 2 is a prior art method for extracting a watermark from an image containing an embedded watermark.

As shown in FIG. 2, the process as described by Honsinger et al. for extracting the message data from a watermarked image 12 consists of the following fundamental steps:

1. Contiguous n×n tiles 12' are formed from the watermarked image 12, I'(x,y);
2. The tiles 12' are averaged 32 across each spatial location (x,y) to form an averaged tile 34;
3. The averaged tile 34 is circularly correlated 36 with the n×n carrier image 22 C(x,y) to produce an extracted n×n message image 14', M'(x,y); and
4. The message data is recovered from the extracted message image 14'.

The averaging 32 of the individual tiles 12' produces a better estimate of the message data (i.e., it improves the signal-to-noise ratio) because the dispersed message image in each tile will add constructively (since it is the same in each tile), while the corresponding original image content in each tile will add destructively (since it is typically different in each tile).

This watermark extraction process can be described mathematically as:

$$M'(x,y)=I'(x,y)\otimes C(x,y)=\alpha[M(x,y)*C(x,y)]\otimes C(x,y)+I(x,y)\otimes C(x,y) \quad (2)$$

where the symbol, $\otimes$, represents circular correlation. Correlation is similar to convolution in that Fourier magnitudes also multiply. In correlation, however, phase subtracts. Therefore, the phase of the carrier image subtracts when the watermarked image is correlated with the carrier image, thus leaving the message image. Indeed, if we again assume that the carrier image is designed to have a substantially flat Fourier amplitude, then the process of correlation of the carrier on the watermarked image Eq. 2, can be reduced to:

$$M'(x,y)=\alpha M(x,y)+\text{noise}. \quad (3)$$

That is, the extracted message image is a scaled version of the original message image plus noise due to the cross correlation of the original image with the carrier image.

More generally, we can rewrite Eq. 2 as:

$$M'(x,y)=\alpha M(x,y)*[C(x,y)\otimes C(x,y)]+\text{noise}. \quad (4)$$

The above equation suggests that the resolution of the extracted message image is fundamentally limited by the autocorrelation function of the carrier image, $C(x,y)\otimes C(x,y)$. Any broadening of $C(x,y)\otimes C(x,y)$ from a delta function will blur the extracted message image when compared to the original message image. Another way to view the effect of the carrier image on the extracted message image is to consider $C(x,y)\otimes C(x,y)$ as a point spread function, since convolution of the original message image with $C(x,y)\otimes C(x,y)$ largely determines the extracted message image.

As described previously, the typical application of this watermarking process to an image sequence results in a fixed watermark pattern for each frame. This is the result of using the same carrier image and message image in generating the watermark, and the resulting watermark is placed in the same location in each frame. This fixed pattern may be objectionable when the sequence is viewed. The present invention overcomes the limitations of the prior art by generating multiple carriers for the watermarking of an image sequence. The use of multiple carriers minimizes the visibility of a watermark by preventing alignment of the same watermark pattern from frame to frame. However, unlike systems where different secret keys are used in generating the carriers, the present invention uses only a single key in combination with deterministic transformations of either the key or the resultant carrier image to produce multiple carrier images. The robustness of the watermark extraction process is unchanged when it is applied to a single frame, because the same carrier image is used within a given frame. Moreover, because the same message image is embedded in each frame, it is possible to combine information from multiple frames after determination of the carrier image used for each frame. The present invention is aimed primarily at watermark methods that embed in the spatial domain using a PN sequence in producing a carrier signal. However, it can also be applied to some frequency domain methods that use a PN sequence in the watermarking process.

Figure 3:
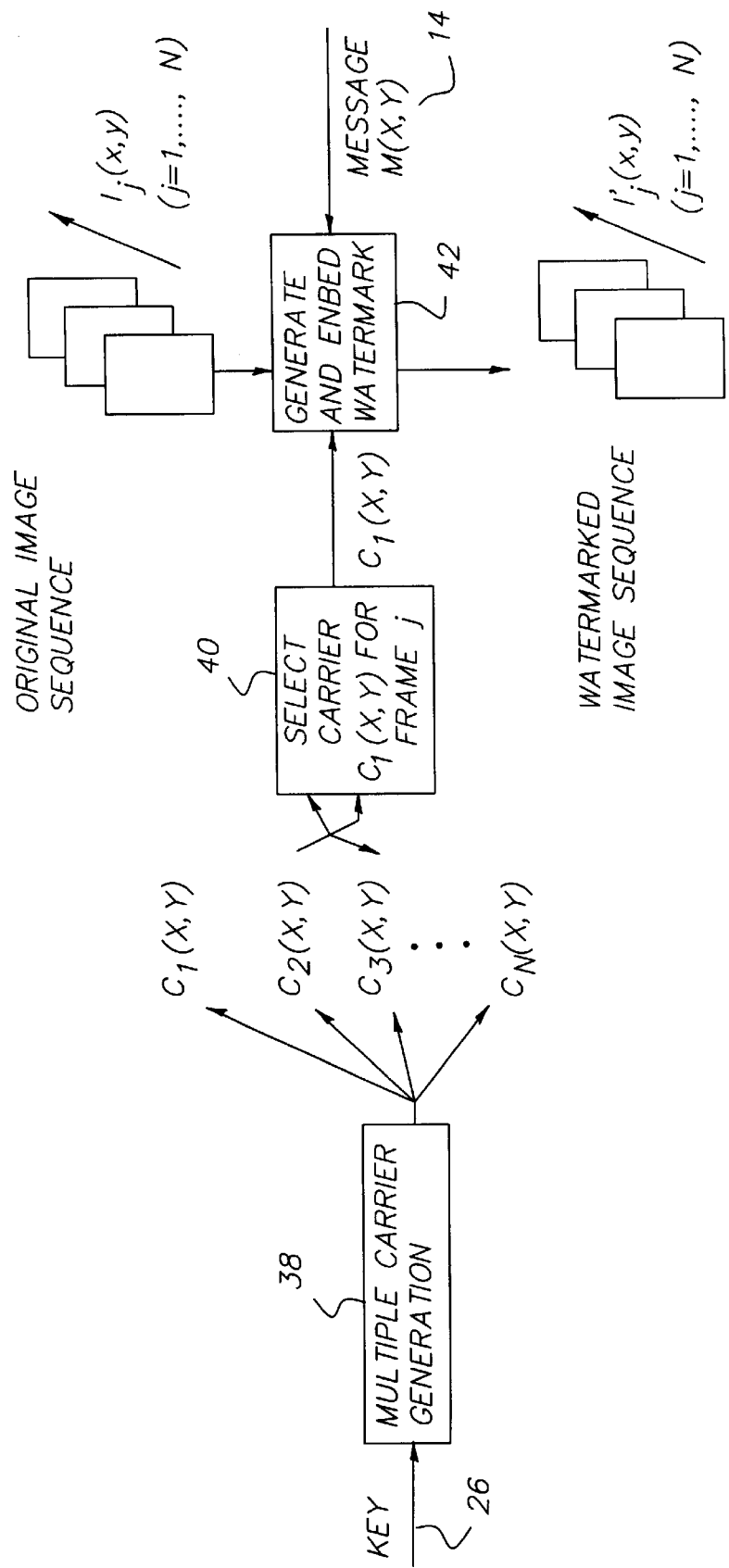
FIG. 3 illustrates the generation of multiple carriers from a single key and the application of the multiple carriers to a sequence of frames in the present invention.

A block diagram that illustrates the present invention is shown in FIG. 3. A single key 26 is sent to a carrier generation step 38 that generates N different carrier images $C_i(x,y)$, (i=1, ..., N) from the single key. Various methods for generating the carrier images from a single key will be described shortly. Now, for each of N consecutive frames $I_j(x,y)$, (j=1, ..., N) in a sequence, a unique carrier image is selected 40 from the set of N carrier images. The carrier image associated with each frame is then convolved with a constant message image 14 $M(x,y)$ to provide a different watermark pattern for each of the N frames. Each watermark pattern is embedded 42 in its corresponding frame to produce a sequence of watermarked frames $I_j'(x,y)$, (j=1, ..., N). For the next set of N consecutive frames in the sequence, this process is repeated. It is possible to use the same ordering of the selected carriers for each set of N consecutive frames, or the ordering may be changed from one set of frames to the next.

Figure 4:
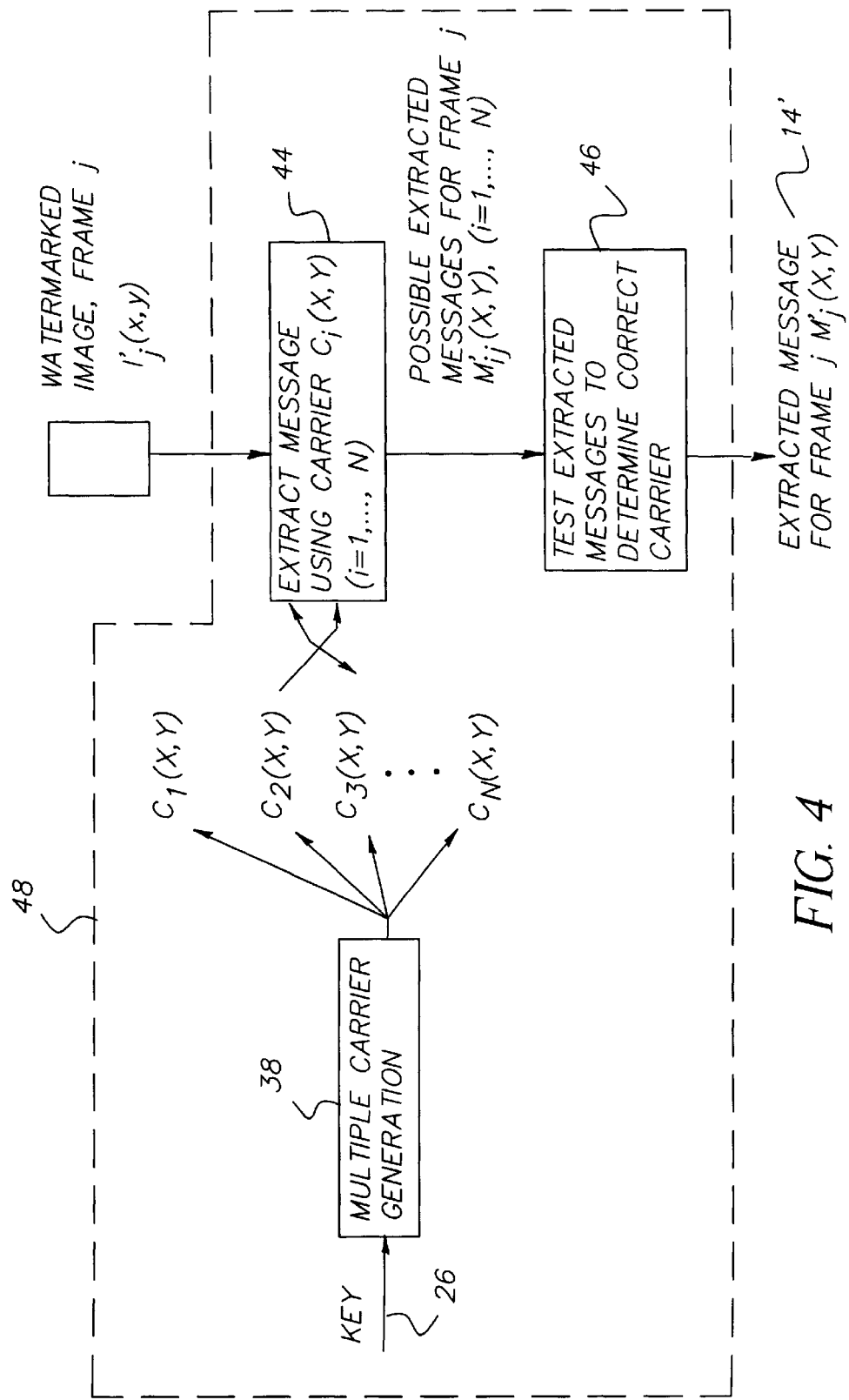
FIG. 4 illustrates the determination of the carrier for a given frame using a search over the set of possible carriers.

For the present invention to work effectively, the extraction process must be able to determine which carrier image was used on a given frame. The process 48 for determining of the correct carrier image for a given frame is illustrated in FIG. 4. As described previously, the extraction process 44 includes forming n×n tiles from the watermarked image, and these tiles are averaged and then correlated with the carrier image. To determine the carrier image that was used on the $j^{th}$ watermarked frame, $I_j'(x,y)$, the averaged tiles are correlated with each possible carrier image $C_i(x,y)$, (i=1, ..., N) that was produced using the carrier generation unit 38 with the single key 26. The resulting extracted message images $M_{ij}'(x,y)$ (i=1, ..., N) can be tested 46 to determine the carrier image that provides the largest correlation peaks in the extracted message image 14'. It is also be possible to determine the carrier image by subjecting the extracted messages to a simple threshold test. If the peaks of the extracted message image with a given carrier image exceed a predetermined threshold, then it may be inferred that the given carrier image is the correct one. Although the determination of the carrier image using an exhaustive search may sound computationally complex, it is noted that the extraction process 44 for each carrier image is performed only on an averaged tile of size n×n, not over the entire watermarked image. In some cases, it may be necessary to determine the correct carrier image for only one frame in a sequence, and the carrier images for the remaining frames are then known from the selection ordering of the carrier images that was performed at the time of the embedding.

There is another approach that can be used to extract the message image that does not require knowledge of which carrier image was used for a given frame. In this approach, we form a "super carrier" $S(x,y)$ that is the summation of all carrier images $C_i(x,y)$, (i=1, ..., N), on a pixel by pixel basis, i.e.

$$S(x,y)=C_1(x,y)+C_2(x,y)+ \ldots +C_N(x,y). \quad (5)$$

Instead of applying each individual carrier image during the extraction process as shown in FIG. 4, we can apply this super carrier. If the carrier images are uncorrelated with each other, then the cross correlations of a given carrier image with the other carrier image will be zero, i.e.

$$C_i(x,y)\otimes C_j(x,y)=0 \text{ for } i\neq j. \quad (6)$$

As a result, only the correct carrier image will contribute during the extraction process, i.e.

$$C_j(x,y)\otimes S(x,y)=C_j(x,y)\otimes[C_1(x,y)+C_2(x,y)+ \ldots +C_j(x,y)+ \ldots \\ +C_N(x,y)]=C_j(x,y)\otimes C_j(x,y) \quad (7)$$

where $C_j(x,y)$ denotes the carrier image used for the $j^{th}$ frame. Thus, the use of the super carrier during the extraction process is equivalent to using only the correct carrier image for a given frame as described previously in FIG. 2. Of course, the carrier images must be carefully designed to insure that they are uncorrelated as any correlation will contribute to the noise term shown in Eq. 4, which can lead to reduced robustness in the extraction process. It is noted that although the present invention uses a single key to generate multiple carriers, the aforementioned method for extraction using the "super carrier" will also work for a system where multiple carriers are generated from multiple keys (again assuming that the carriers are uncorrelated).

The generation of multiple carrier images from a single key can be performed by a number of different means. Regardless of the specific method, the carrier images that are produced by a single key are correlated in a cryptographic sense (but not necessarily in a statistical correlation sense), which can lead to concerns about the inherent security of this approach. However, one can easily increase the key length to overcome most of these concerns. More importantly, from a perceptual point-of-view, the carrier images are independent realizations, and the resulting watermark patterns will be entirely different to an observer, even though a single key was used in their generation.

Figure 5:
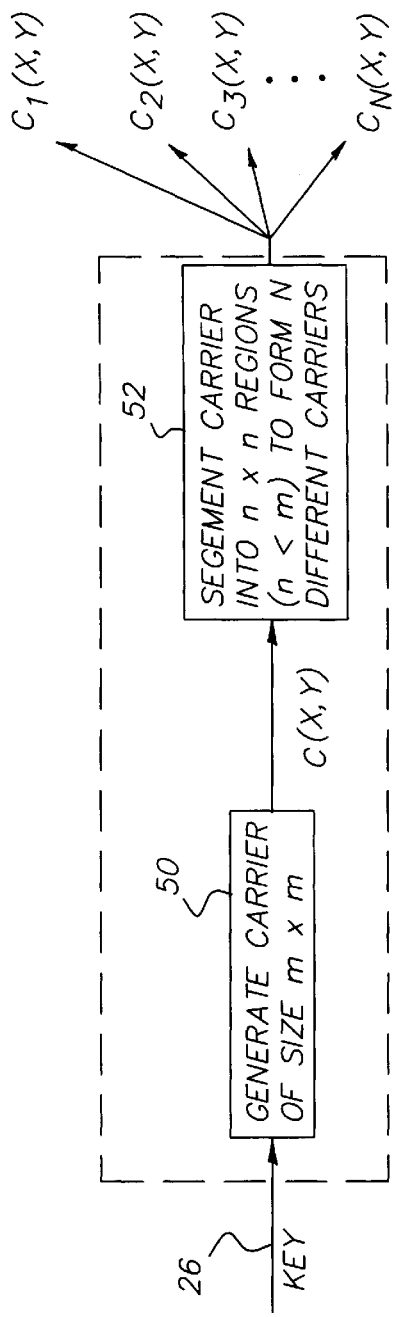
FIG. 5 illustrates the generation of multiple carriers from a single key by segmenting a larger carrier image into regions.
Figure 6:
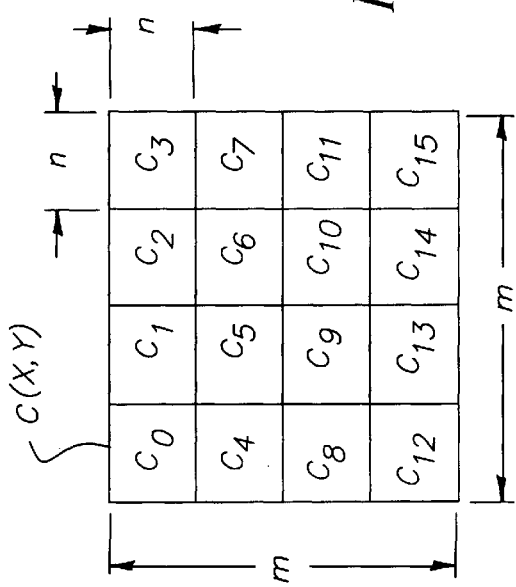
FIG. 6 illustrates the segmentation of a larger carrier image into smaller carrier images by forming non-overlapping, contiguous regions.

As shown in FIG. 5, in a preferred embodiment, the single key 26 is used to generate 50 a carrier image $C(x,y)$ of size m×m, where m is chosen to be larger than the actual carrier image 22 that is used in the watermarking process (i.e., the embedded tile size is n×n, where n<m). The different carrier images $C_i(x,y)$, (i=1, . . . , N) can be produced from the larger carrier image, $C(x,y)$, by simply segmenting 52 $C(x,y)$ into N different n×n regions. The segmentation 52 of $C(x,y)$ can be done in a variety of ways, but the most straightforward is to choose m to be an integer multiple of n and segment $C(x,y)$ into non-overlapping, contiguous regions as shown in FIG. 6.

Figure 7:
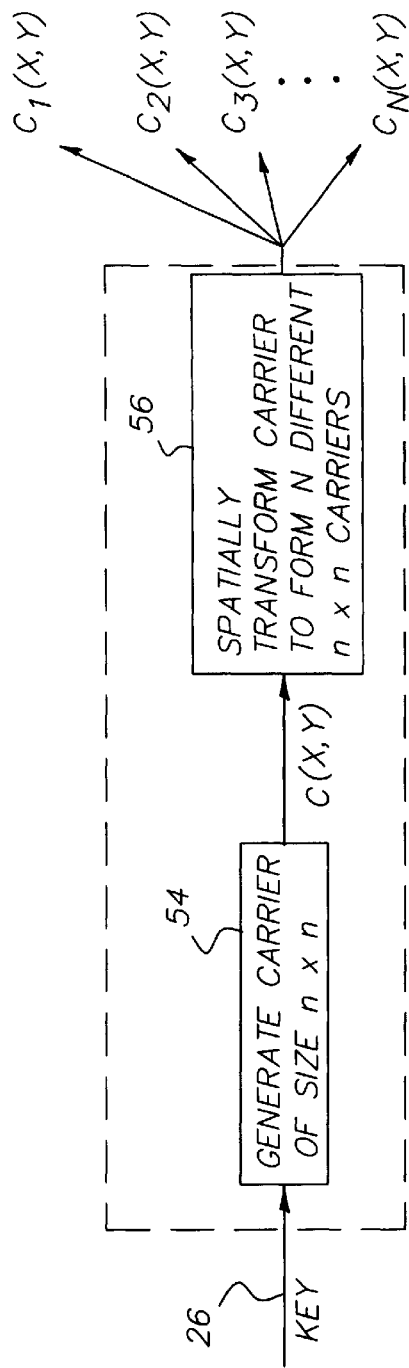
FIG. 7 illustrates the generation of multiple carriers from a single key by spatially transforming a carrier image.

As shown in FIG. 7, in another preferred embodiment, the single key 26 is used to generate 54 a carrier image $C(x,y)$ of the same size (n×n) as the actual carrier used in the watermarking process. Different carrier images are then formed by spatially transforming 56 this initial carrier image $C(x,y)$. The spatial transformations can include, but are not limited to: rotations around the carrier image center at 90° increments; rotations around the horizontal, vertical, or diagonal axes of the carrier image; and reordering the lines and/or columns of the carrier image in some pre-determined manner. This approach is somewhat more constrained than the previous embodiment in that there may be a limited number of spatial rearrangements that are sufficiently different in a perceptual and/or statistical correlation sense.

Figure 8:
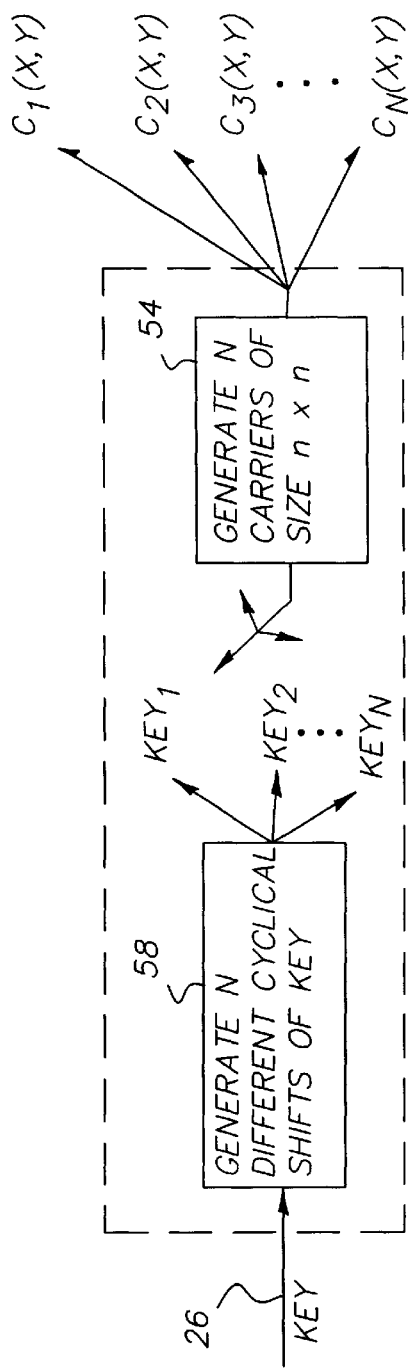
FIG. 8 illustrates the generation of multiple carriers from a single key by forming cyclical shifts of the key.

As shown in FIG. 8, in still another preferred embodiment, the single key 26 is cyclically shifted 58 by different numbers of bits to produce N different keys. Each different key is then used to generate 54 a different n×n carrier image. A cyclical shift of the initial key by just one bit is sufficient to produce a completely different carrier image. As noted previously, the different keys (and resulting carrier images) produced by this method are cryptographically correlated, but the initial key length can be increased to provide a level of security that is comparable to that provided by the use of N independent keys.

Figure 9:
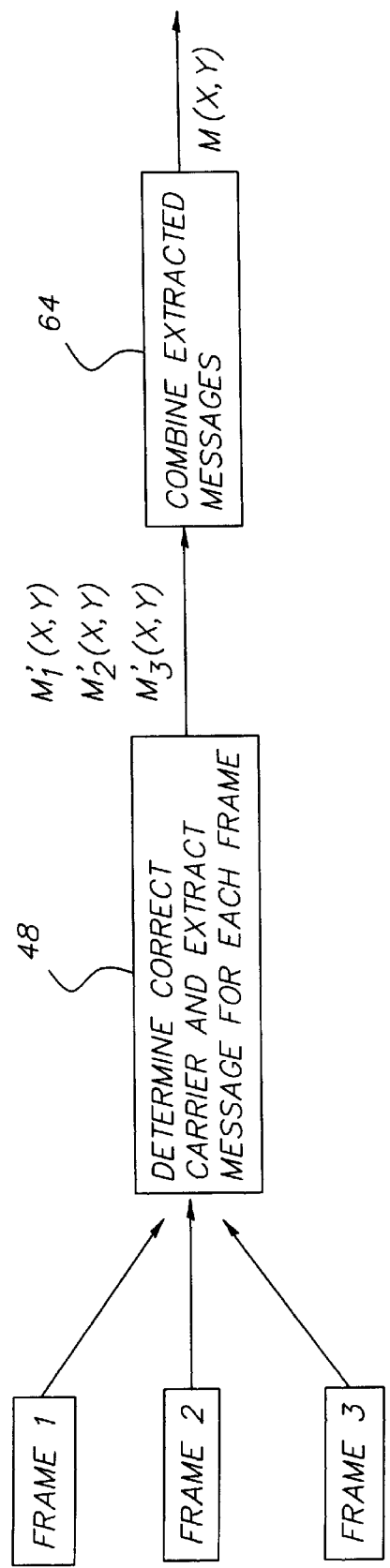
FIG. 9 illustrates the process for combining the extracted messages from multiple frames.

Although different carrier images are used for each frame in the sequence, the same message image is used for all frames. As a result, the extracted message images from any number of frames can be combined after determining the carrier images of each frame. This process is illustrated in FIG. 9, where the correct carrier image for each frame is determined 48, and then the extracted message images for the frames are combined 64. Moreover, if there are frames in the sequence that use the same carrier image (e.g. every $N^{th}$ frame might use the same carrier image), it is also possible to directly combine the tiles from these frames and then extract the message from the average of the combined tiles. In either approach, combining the information from multiple frames provides a more robust estimate by increasing the signal-to-noise ratio of the extracted message, which can improve performance under certain types of removal attacks and/or allows for the amplitude of the watermark to be reduced to a lower level. Reducing the amplitude further reduces the visibility of the watermark.

In some applications of the present invention, it may be desirable to use the same carrier image for several consecutive frames, rather than changing the carrier image with each frame. This may provide additional robustness to the watermark extraction process when the image sequence data has been modified during certain types of attacks. For example, if a video camcorder is used to capture an illegal copy of a projected movie in a theater, there is a mismatch of the temporal sampling rates of the projected image (24 progressive frames per second) and the video camcorder (60 interlaced fields per second). If the watermark pattern is changed with each frame, there will be occasions when the camcorder will integrate different watermark patterns over two frames. By allowing the same watermark pattern to persist for two frames, there is an increased probability that the watermark can be extracted from any field or interlaced frame of the illegal video copy. Of course, increasing the display duration of the same watermark pattern beyond two frames might further increase the robustness of the extraction process, but the slowly changing watermark pattern will also be more easily perceived than one that is changing every frame or every other frame.

While the invention has been discussed in terms of the spatial domain watermarking process as described by Honsinger et al., it is obvious how the same method can be applied to any spatial domain watermarking process that uses a carrier image in the watermarking process. It is important to note that some spatial domain watermarking processes use more than one carrier image within a single image, where the resulting watermark pattern is the sum of the carrier images after modulation by the message information. An example of such a watermarking process can be found in U.S. Pat. No. 5,636,292 "Steganography methods employing embedded calibration data" by Rhoads. Although the method described in the aforementioned patent also uses multiple carrier images, this method is fundamentally different from the present invention in two ways. First, the multiple carrier images that are used in the method by Rhoads are employed within a single image, not across multiple frames in a sequence. Second, the set of carrier images is fixed, thus producing a given watermark pattern that is constant from frame to frame. It is entirely possible to use the present invention in conjunction with the method of Rhoads when watermarking an image sequence by changing one or more of the carrier images from frame to frame. Again, a single key can be used in generating the different carriers, using one or more of the methods described previously.

Although the present invention has been described using the preferred data embedding and extraction methods of Honsinger et al. that use two-dimensional carrier images, it is noted that the same concepts can be applied to other watermarking methods that use one-dimensional carrier signals. For example, some types of frequency domain watermarking methods for images use a PN sequence in the watermarking process. A different PN sequence can be generated for each frame using one or more of the previously described methods.

The invention has been described in detail with particular reference to certain preferred embodiments thereof, but it will be understood that variations and modifications can be effected within the spirit and scope of the invention.

What is claimed is:

1. A method for embedding a watermark signal that contains message data in a digital image sequence having two or more frames, comprising the steps of:
   a) producing a set of two or more different carrier signals;
   b) assigning a carrier signal from the set of carrier signals to each frame in the sequence;
   c) combining the message data with each carrier signal to produce a sequence of watermark signals;
   d) embedding a watermark signal in the two or more frames of the image sequence; and
   e) extracting the message data from at least one frame of a copy of the image sequence by producing a super carrier signal by summing the set of carrier signals and using the super carrier signal to extract the message data.

2. The method claimed in claim 1, wherein the carrier signals are random phase carrier images, and wherein the embedding step includes the steps of:
   c1) creating a message image representing the message data;
   c2) convolving the message image with each carrier image to produce a sequence of dispersed message images; and
   c3) combining the dispersed message images with the respective frames of the digital image sequence.

3. The method claimed in claim 1, wherein the set of carrier signals is produced by cyclically shifting the secure key for each carrier signal.

4. The method claimed in claim 2, wherein the random phase carrier images are produced by cyclically shifting the secure key for each carrier image.

5. The method claimed in claim 2, wherein the random phase carrier images are produced by the steps of:
   a1) generating a large random phase carrier image; and
   a2) segmenting the large random phase carrier image into smaller random phase carrier images to produce the set of random phase carrier images.

6. The method claimed in claim 2, wherein the random phase carrier images are produced by the steps of:
   a1) generating an initial random phase carrier image; and
   a2) spatially transforming the initial random phase carrier image to produce the set of random phase carrier images.

7. The method claimed in claim 1, further comprising the step of extracting message data from at least one frame of the image sequence.

8. The method claimed in claim 2, further comprising the step of extracting the message image from at least one frame of the image sequence.

9. The method claimed in claim 8, wherein the message image is extracted by producing a super carrier image by summing the set of carrier images and correlating the super carrier image with the image sequence frame.

10. The method claimed in claim 1, wherein the same carrier signal is assigned to two or more consecutive frames.

11. The method claimed in claim 2, wherein the same carrier image is assigned to two or more consecutive frames.

12. A system for embedding a watermark signal that contains message data in a digital image sequence having two or more frames, comprising:
   a) means for producing a set of two or more different carrier signals from a single secure key;
   b) means for assigning a carrier signal from the set of carrier signals to each frame in the sequence;
   c) means for combining the message data with each carrier signal to produce a sequence of watermark signals;
   d) means for embedding a watermark signal in the two or more frames of the image sequence; and
   e) means for extracting the message data from at least one frame of a copy of the image sequence by producing a super carrier signal by summing the set of carrier signals and using the super carrier signal to extract the message data.

13. The system claimed in claim 12, wherein the carrier signals are random phase carrier images, and wherein the means for embedding includes:
   c1) means for creating a message image representing the message data;
   c2) means for convolving the message image with each carrier image to produce a sequence of dispersed message images; and
   c3) means for combining the dispersed message images with the respective frames of the digital image sequence.

14. The system claimed in claim 12, wherein the set of carrier signals is produced by cyclically shifting the secure key for each carrier signal.

15. The system claimed in claim 13, wherein the set of carrier images is produced by cyclically shifting the secure key for each carrier image.

16. The system claimed in claim 13, wherein the random phase carrier images includes:
   a1) means for generating a large random phase carrier image; and
   a2) means for segmenting the large random phase carrier image into smaller random phase carrier images to produce the set of random phase carrier images.

17. The system claimed in claim 13, wherein the means for generating random phase carrier images includes:
   a1) means for generating an initial random phase carrier image; and
   a2) means for spatially transforming the initial random phase carrier image to produce the set of random phase carrier images.

18. The system claimed in claim 12, further comprising means for extracting message data from at least one frame of the image sequence.

19. The system claimed in claim 13, further comprising means for extracting the message image from at least one frame of the image sequence.

20. The system claimed in claim 19, wherein the message image is extracted by producing a super carrier image by summing the set of carrier images and correlating the super carrier image with the image sequence frame.

21. The system claimed in claim 12, wherein the same carrier signal is assigned to two or more consecutive frames.

22. The system claimed in claim 13, wherein the same carrier image is assigned to two or more consecutive frames.

23. A computer program embodied in a computer readable medium for performing the method of claim 1.

* * * * *